United States Patent
Tsunozaki et al.

(10) Patent No.: US 9,444,099 B2
(45) Date of Patent: Sep. 13, 2016

(54) PROCESS FOR PRODUCING CATHODE ACTIVE MATERIAL FOR LITHIUM ION SECONDARY BATTERY, CATHODE FOR LITHIUM ION SECONDARY BATTERY, AND LITHIUM ION SECONDARY BATTERY

(71) Applicant: ASAHI GLASS COMPANY, LIMITED, Chiyoda-ku (JP)

(72) Inventors: Kentaro Tsunozaki, Tokyo (JP); Haisheng Zeng, Tokyo (JP); Takeshi Kawasato, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 303 days.

(21) Appl. No.: 14/139,969

(22) Filed: Dec. 24, 2013

(65) Prior Publication Data

US 2014/0113194 A1  Apr. 24, 2014

Related U.S. Application Data

(63) Continuation of application No. PCT/JP2012/066060, filed on Jun. 22, 2012.

(30) Foreign Application Priority Data

Jun. 24, 2011 (JP) ................. 2011-140494

(51) Int. Cl.
| | | |
|---|---|---|
| *H01M 4/36* | (2006.01) | |
| *H01M 4/485* | (2010.01) | |
| *H01M 4/505* | (2010.01) | |
| *H01M 4/525* | (2010.01) | |
| *C01G 53/00* | (2006.01) | |
| *H01M 10/052* | (2010.01) | |

(52) U.S. Cl.
CPC .............. *H01M 4/366* (2013.01); *C01G 53/50* (2013.01); *H01M 4/485* (2013.01); *H01M 4/505* (2013.01); *H01M 4/525* (2013.01); *H01M 10/052* (2013.01); *C01P 2004/61* (2013.01); *C01P 2004/80* (2013.01); *C01P 2004/84* (2013.01); *C01P 2006/12* (2013.01); *C01P 2006/19* (2013.01); *Y02E 60/122* (2013.01); *Y02P 70/54* (2015.11)

(58) Field of Classification Search
None
See application file for complete search history.

(56) References Cited

U.S. PATENT DOCUMENTS

| | | | | |
|---|---|---|---|---|
| 2004/0229124 A1* | 11/2004 | Miyamoto | ........ | H01M 10/0525 429/231.1 |
| 2006/0057466 A1* | 3/2006 | Suhara | ................ | H01M 4/1315 429/322 |
| 2008/0160414 A1* | 7/2008 | Jitsugiri | ................ | C01D 15/02 429/223 |
| 2009/0087362 A1* | 4/2009 | Sun | .................... | C01G 45/1221 423/179.5 |
| 2013/0236788 A1 | 9/2013 | Tsunozaki et al. | | |
| 2013/0309576 A1* | 11/2013 | Ogata | .................. | H01M 4/366 429/231.1 |
| 2013/0318780 A1 | 12/2013 | Tsunozaki et al. | | |

FOREIGN PATENT DOCUMENTS

| | | |
|---|---|---|
| CN | 101154727 A | 4/2008 |
| CN | 101785134 A | 7/2010 |
| JP | 2008-536285 | 9/2008 |
| JP | 2009-110952 | 5/2009 |
| JP | 2010-86922 | 4/2010 |
| WO | 2007/102407 | 9/2007 |

OTHER PUBLICATIONS

U.S. Appl. No. 14/691,818, filed Apr. 21, 2015, Kawasato, et al.
U.S. Appl. No. 14/694,342, filed Apr. 23, 2015, Hardiyanto, et al.
U.S. Appl. No. 14/139,952, filed Dec. 24, 2013, Tsunozaki, et al.
U.S. Appl. No. 14/140,059, filed Dec. 24, 2013, Murotani, et al.
International Search Report issued Oct. 9, 2012 in PCT/JP2012/066060 filed Jun. 22, 2012.

* cited by examiner

*Primary Examiner* — Carlos Barcena
*Assistant Examiner* — Wojciech Haske
(74) *Attorney, Agent, or Firm* — Oblon, McClelland, Maier & Neustadt, L.L.P.

(57) ABSTRACT

To provide a cathode active material for a lithium ion secondary battery, and its production process.
A lithium-containing composite oxide containing a transition metal element and a composition (1) are contacted to obtain particles (I) having a compound containing a metal element (M) attached, which are mixed with a compound which generates HF by heating, and the mixture is heated to obtain particles (III) having a covering layer (II) containing the metal element (M) and fluorine element formed on the surface of the lithium-containing composite oxide. Composition (1): a composition having a compound containing no Li element and containing at least one metal element (M) selected from Mg, Ca, Sr, Ba, Y, Ti, Zr, Hf, V, Nb, Ta, Cr, Mo, W, Mn, Fe, Co, Ni, Pb, Cu, Zn, Al, In, Sn, Sb, Bi, La, Ce, Pr, Nd, Gd, Dy, Er and Yb dissolved or dispersed in a solvent.

15 Claims, No Drawings

PROCESS FOR PRODUCING CATHODE ACTIVE MATERIAL FOR LITHIUM ION SECONDARY BATTERY, CATHODE FOR LITHIUM ION SECONDARY BATTERY, AND LITHIUM ION SECONDARY BATTERY

TECHNICAL FIELD

The present invention relates to a process for producing a cathode active material for a lithium ion secondary battery, a cathode, and a lithium ion secondary battery.

BACKGROUND ART

Lithium ion secondary batteries are widely used for portable electronic instruments such as mobile phones or notebook-size personal computers. As a cathode active material for a lithium ion secondary battery, a composite oxide of lithium with a transition metal, etc. (hereinafter sometimes referred to as lithium-containing composite oxide) such as $LiCoO_2$, $LiNiO_2$, $LiNi_{0.8}Co_{0.2}O_2$ or $LiMn_2O_4$, is employed. In recent years, it is desired to further reduce the size and weight as a lithium ion secondary battery for portable electronic instruments or vehicles, and a further improvement in the discharge capacity per unit mass and in the characteristics such that the discharge capacity will not be decreased after charge and discharge cycles are repeatedly carried out (hereinafter sometimes referred to as cycle characteristic), is desired.

To improve the cycle characteristics, it has been known to be effective to form a covering layer on a lithium-containing composite oxide.

Patent Document 1 discloses a process of adding an ammonium fluoride aqueous solution to a dispersion having a lithium-containing composite oxide dispersed in an aluminum nitrate aqueous solution, followed by filtration, washing and heating to form a covering layer of aluminum fluoride on the surface of the lithium-containing composite oxide. However, by this process, a step of carrying out filtration and washing is essential, whereby the process is complicated and in addition, a waste disposal treatment is necessary, and thus the process is inferior in the productivity. Further, when the wet cake after filtration is dried, the cathode active material tends to be agglomerated to form coarse particles.

Patent Document 2 discloses a method of fluorinating a cathode material using a fluorinating agent such as fluorine ($F_2$), nitrogen trifluoride or chlorine trifluoride. However, this method requires special equipment since a highly toxic gas is used.

Patent Document 3 discloses a process of stirring and mixing an aqueous solution containing zirconium and a lithium-containing composite oxide represented by the formula $Li_pN_xM_yO_zF_a$ ($0.9 \leq p \leq 1.1$, $0.965 \leq x < 1.00$, $0 < y \leq 0.035$, $1.9 \leq z \leq 2.1$, $x+y=1$ and $0 \leq a \leq 0.02$) wherein the molar amount of Li element is from 0.9 to 1.1 molar times the total molar amount of the transition metal element, and firing the mixture at high temperature of at least 450° C. in an oxygen atmosphere to obtain a cathode active material having the surface layer of the lithium-containing composite oxide covered with zirconium oxide. By this method, it is difficult to cover the lithium-containing composite oxide with a compound other than an oxide.

PRIOR ART DOCUMENTS

Patent Documents

Patent Document 1: JP-A-2008-536285
Patent Document 2: JP-A-2009-110952
Patent Document 3: WO2007/102407

DISCLOSURE OF INVENTION

Technical Problem

The present invention provides a process for producing a cathode active material for a lithium ion secondary battery excellent in the cycle characteristics even after charging is carried out at a high voltage. Further, the present invention provides a cathode and a lithium ion secondary battery using a cathode active material obtainable by the production process.

Solution To Problem

The present invention provides the following.

[1] A process for producing a cathode active material for a lithium ion secondary battery, which comprises contacting a lithium-containing composite oxide containing Li element and a transition metal element with the following composition (1) to obtain particles (I) having a compound containing a metal element (M) attached, and mixing the particles (I) and the following compound (2) and heating the mixture to obtain particles (III) having a covering layer (II) containing the metal element (M) and fluorine element formed on the surface of the lithium-containing composite oxide:

composition (1): a composition having a compound containing no Li element and containing at least one metal element (M) selected from the group consisting of Mg, Ca, Sr, Ba, Y, Ti, Zr, Hf, V, Nb, Ta, Cr, Mo, W, Mn, Fe, Co, Ni, Pb, Cu, Zn, Al, In, Sn, Sb, Bi, La, Ce, Pr, Nd, Gd, Dy, Er and Yb dissolved or dispersed in a solvent;

compound (2): a compound which generates HF by heating.

[2] The process for producing a cathode active material for a lithium ion secondary battery according to [1], wherein the compound (2) is ammonium fluoride or ammonium bifluoride.

[3] The process for producing a cathode active material for a lithium ion secondary battery according to [1] or [2], wherein in the composition (1), the metal element (M) is at least one member selected from the group consisting of Al, Nb and Zr.

[4] The process for producing a cathode active material for a lithium ion secondary battery according to any one of [1] to [3], wherein heating is carried out at from 250 to 700° C.

[5] The process for producing a cathode active material for a lithium ion secondary battery according to any one of [1] to [4], wherein the lithium-containing composite oxide and the composition (1) are contacted so that the molar amount of the metal element (M) in the particles (I) is from 0.001 to 0.05 time the molar amount of the transition metal element in the lithium-containing composite oxide.

[6] The process for producing a cathode active material for a lithium ion secondary battery according to any one of [1] to [5], wherein the particles (I) and the compound (2) are mixed and heated so that the amount of fluorine element present in the covering layer (II) is from 0.05 to 3 mass % based on the total mass of the cathode active material.

[7] The process for producing a cathode active material for a lithium ion secondary battery according to any one of [1] to [6], wherein the solvent of the composition (1) is water.

[8] The process for producing a cathode active material for a lithium ion secondary battery according to any one of [1] to [7], wherein contact of the lithium-containing composite oxide and the composition (1) is carried out by adding the composition (1) to the lithium-containing composite oxide with stirring and mixing the lithium-containing composite oxide and the composition (1).

[9] The process for producing a cathode active material for a lithium ion secondary battery according to any one of [1] to [7], wherein contact of the lithium-containing composite oxide and the composition (1) is carried out by spraying the composition (1) to the lithium-containing composite oxide.

[10] A cathode for a lithium ion secondary battery, which comprises a cathode active material for a lithium ion secondary battery obtained by the production process as defined in any one of [1] to [9], an electrically conductive material and a binder.

[11] A lithium ion secondary battery comprising the cathode for a lithium ion secondary battery as defined in [10], an anode and a non-aqueous electrolyte.

Advantageous Effects of Invention

According to the production process of the present invention, a cathode active material excellent in the cycle characteristics even when charging is carried out at a high voltage can be produced with a good productivity. The cathode and the lithium ion secondary battery of the present invention are excellent in the cycle characteristics even when charging is carried out at a high voltage.

DESCRIPTION OF EMBODIMENTS

<Process for Producing Cathode Active Material>

The production process of the present invention is a production process, which comprises contacting a lithium-containing composite oxide containing Li element and a transition metal element with the following composition (1) to obtain particles (I) having a compound containing a metal element (M) attached, and mixing the particles (I) and the following compound (2) and heating the mixture to obtain particles (III) having a covering layer (II) containing the metal element (M) and fluorine element formed on the surface of the lithium-containing composite oxide:

composition (1): a composition having a compound containing no Li element and containing at least one metal element (M) selected from the group consisting of Mg, Ca, Sr, Ba, Y, Ti, Zr, Hf, V, Nb, Ta, Cr, Mo, W, Mn, Fe, Co, Ni, Pb, Cu, Zn, Al, In, Sn, Sb, Bi, La, Ce, Pr, Nd, Gd, Dy, Er and Yb dissolved or dispersed in a solvent;

compound (2): a compound which generates HF by heating.

In the production process of the present invention, first, a lithium-containing composite oxide containing Li element and a transition metal element and a composition (1) are contacted to obtain particles (I) covered with a compound containing a metal element (M).

(Lithium-containing Composite Oxide)

The lithium-containing composite oxide of the present invention contains Li element and a transition metal element.

As the transition metal element, for example, at least one member selected from the group consisting of Ni, Co, Mn, Fe, Cr, V and Cu may be used.

The lithium-containing composite oxide is preferably, for example, a compound (i) represented by the following formula (A), an olivin metal lithium salt (ii) which is a substance represented by the following formula (B) or a composite thereof, a compound (iii) represented by the following formula (C-1) or a compound (iv) represented by the following formula (D). They may be used alone or in combination of two or more.

The lithium-containing composite oxide is particularly preferably the compound (iii) in view of a high capacity, most preferably a compound represented by the following formula (C-1) or (C-2).

(Compound (i))

$$Li_a(Ni_xMn_yCo_z)Me_bO_2 \quad (A)$$

wherein $0.95 \leq a \leq 1.1$, $0 \leq x \leq 1$, $0 \leq y \leq 1$, $0 \leq z \leq 1$, $0 \leq b \leq 0.3$, $0.90 \leq x+y+z+b \leq 1.05$, and Me is at least one member selected from the group consisting of Mg, Ca, Sr, Ba and Al.

The compound (i) represented by the formula (A) may be $LiCoO_2$, $LiNiO_2$, $LiMnO_2$, $LiMn_{0.5}Ni_{0.5}O_2$, $LiNi_{0.5}Co_{0.2}Mn_{0.3}O_2$, $LiNi_{0.85}Co_{0.10}Al_{0.05}O_2$ or $LiNi_{1/3}Co_{1/3}Mn_{1/3}O_2$.

(Olivin Metal Lithium Salt (ii))

$$Li_LX_{x'}Y_{y'}O_{z'}F_g \quad (B)$$

wherein X is Fe(II), Co(II), Mn(II), Ni(II), V(II) or Cu(II), Y is P or Si, $0 \leq L \leq 3$, $1 \leq x' \leq 2$, $1 \leq y' \leq 3$, $4 \leq z' \leq 12$ and $0 \leq g \leq 1$.

The olivin metal lithium salt (ii) may be $LiFePO_4$, $Li_3Fe_2(PO_4)_3$, $LiFeP_2O_7$, $LiMnPO_4$, $LiNiPO_4$, $LiCoPO_4$, $Li_2FePO_4F$, $Li_2MnPO_4F$, $Li_2NiPO_4F$, $Li_2CoPO_4F$, $Li_2FeSiO_4$, $Li_2MnSiO_4$, $Li_2NiSiO_4$ or $Li_2CoSiO_4$.

(Compound (iii))

The compound (iii) is a compound represented by the following formula (C-1). The representation of the compound represented by the following formula (C-1) is for the compositional formula before charge/discharge or the treatment such as activation.

Here, activation means to remove lithium oxide ($Li_2O$) or lithium and lithium oxide from the lithium-containing composite oxide. As a usual activation method, an electrochemical activation method of charging at a voltage higher than 4.4 V or 4.6 V (a value represented by a potential difference with $Li^+/Li$ oxidation-reduction potential). Further, a chemical activation method of carrying out a chemical reaction using an acid such as sulfuric acid, hydrochloric acid or nitric acid may be mentioned.

$$Li(Li_xMn_yMe'_z)O_pF_q \quad (C-1)$$

In the formula (C-1), Me' is at least one element selected from the group consisting of Co, Ni, Cr, Fe, Al, Ti, Zr and Mg. Further, in the formula (C-1), $0.09<x<0.3$, $y>0$, $z>0$, $1.9<p<2.1$ and $0 \leq q \leq 0.1$, and $0.4 \leq y/(y+z) \leq 0.8$, $x+y+z=1$ and $1.2<(1+x)/(y+z)$. That is, in the compound represented by the formula (C-1), the proportion of Li exceeds 1.2 molar times the total amount of Mn and Me'. Further, the compound of the formula (C-1) is also characterized by containing Mn in a specific amount, and the proportion of Mn to the total amount of Mn and Me' is preferably from 0.4 to 0.8, more preferably from 0.55 to 0.75. When Mn is within the above range, the discharge capacity tends to be high.

Here, q represents the proportion of F, or is 0 when F is not present. Further, p is a value determined according to x, y, z and q, and is from 1.9 to 2.1.

In a case where the lithium-containing composite oxide is the compound represented by the formula (C-1), the compositional ratio of the Li element to the total molar amount of the transition metal element is preferably $1.25 \leq (1+x)/(y+z) \leq 1.75$, more preferably $1.35 \leq (1+x)/(y+z) \leq 1.65$, particularly preferably $1.40 \leq (1+x)/(y+z) \leq 1.55$. When the compositional ratio is within the above range, a cathode material having a high discharge capacity per unit mass when a high discharge voltage of at least 4.6 V is applied, can be obtained.

The compound (iii) is more preferably a compound represented by the following formula (C-2):

$$Li(Li_xMn_yNi_vCo_w)O_p \quad (C-2)$$

In the formula (C-2), $0.09<x<0.3$, $0.36<y<0.73$, $0<v<0.32$, $0<w<0.32$, $1.9<p<2.1$ and $x+y+v+w=1$.

In the formula (C-2), the compositional ratio of the Li element to the total amount of Mn, Ni and Co element is $1.2<(1+x)/(y+v+w)<1.8$, preferably $1.35<(1+x)/(y+v+w)<1.65$, more preferably $1.45<(1+x)/(y+v+w)<1.55$.

The compound (iii) is particularly preferably $Li(Li_{0.16}Ni_{0.17}CO_{0.08}Mn_{0.59})O_2$, $Li(Li_{0.17}Ni_{0.17}Co_{0.17}Mn_{0.49})O_2$, $Li(Li_{0.17}Ni_{0.21}CO_{0.08}Mn_{0.54})O_2$, $Li(Li_{0.17}Ni_{0.14}Co_{0.14}Mn_{0.55})O_2$, $Li(Li_{0.18}Ni_{0.12}CO_{0.12}Mn_{0.58})O_2$, $Li(Li_{0.18}Ni_{0.16}CO_{0.12}Mn_{0.54})O_2$, $Li(Li_{0.20}Ni_{0.12}CO_{0.08}Mn_{0.60})O_2$, $Li(Li_{0.20}Ni_{0.16}CO_{0.08}Mn_{0.56})O_2$ or $Li(Li_{0.20}Ni_{0.13}CO_{0.13}Mn_{0.54})O_2$.

The compound represented by the formula (C-1) or (C-2) is preferably one having a layered rock salt type crystal structure (space group R-3m). Further, as the proportion of the Li element to the transition metal element is high, in the XRD (X-ray diffraction: CuKα) measurement, a peak is observed within a range of $2\theta=20$ to $25°$ like layered $Li_2MnO_3$.

(Compound (iv))

$$Li(Mn_{2-x}Me''_x)O_4 \quad (D)$$

In the formula (D), $0 \leq x < 2$, and Me'' is Co, Ni, Fe, Ti, Cr, Mg, Ba, Nb, Ag or Al.

The compound (iv) represented by the formula (D) may be $LiMn_2O_4$, $LiMn_{1.5}Ni_{0.5}O_4$, $LiMn_{1.0}Co_{1.0}O_4$, $LiMn_{1.85}Al_{0.15}O_4$ or $LiMn_{1.9}Mg_{0.1}O_4$.

The lithium-containing composite oxide is preferably in the form of particles. The average particle size ($D_{50}$) of the lithium-containing composite oxide is preferably from 0.03 to 30 μm, more preferably from 0.04 to 25 μm, particularly preferably from 0.05 to 20 μm. Here, the average particle size ($D_{50}$) means a volume-based cumulative 50% size which is a particle size at a point of 50% on an accumulative curve when the accumulative curve is drawn by obtaining the particle size distribution on the volume basis and taking the whole to be 100%. The particle size distribution is obtained from the frequency distribution and accumulative volume distribution curve measured by means of a laser scattering particle size distribution measuring apparatus. The measurement of particle sizes is carried out by sufficiently dispersing the powder in an aqueous medium by an ultrasonic treatment and measuring the particle size distribution (for example, by means of a laser diffraction/scattering type particle size distribution measuring apparatus Partica LA-950VII, manufactured by HORIBA Ltd).

In a case where the lithium composite oxide is a compound selected from the compounds (i), (iii) and (iv), the average particle size ($D_{50}$) is preferably from 3 to 30 μm, more preferably from 4 to 25 μm, particularly preferably from 5 to 20 μm. In a case where the lithium composite oxide is the compound (ii), the average particle size (D50) is preferably from 0.03 to 5 μm, more preferably from 0.04 to 1 μm, particularly preferably from 0.05 to 0.5 μm.

The specific surface area of the lithium-containing composite oxide is preferably from 0.1 to 30 $m^2/g$, particularly preferably from 0.15 to 25$m^2/g$. When the specific surface area is from 0.1 to 30 $m^2/g$, a dense cathode electrode layer having a high capacity can be formed.

In a case where the lithium-containing composite oxide is a compound selected from the compounds (i) and (iv), the specific surface area is preferably from 0.1 to 1 $m^2/g$, more preferably from 0.15 to 0.6 $m^2/g$. In a case where the lithium composite oxide is the compound (iii), the specific surface area is preferably from 0.3 to 10 $m^2/g$, more preferably from 0.5 to 5 $m^2/g$, particularly preferably from 1 to 4 $m^2/g$. In a case where the lithium composite oxide is the compound (ii), the specific surface area is preferably from 1 to 30 $m^2/g$, more preferably from 10 to 25 $m^2/g$.

As a method for producing the lithium-containing composite oxide, a method of mixing a precursor of the lithium-containing composite oxide obtained by a coprecipitation method and a lithium compound, followed by firing, a hydrothermal synthesis method, a sol-gel method, a dry mixing method (solid phase method), an ion exchange method or a glass crystallization method may properly be employed. Here, since the discharge capacity will be improved when the transition metal element is uniformly contained in the lithium-containing composite oxide, it is preferred to employ a method of mixing a precursor (coprecipitated composition) of the lithium-containing composite oxide obtained by a coprecipitation method and a lithium compound, followed by firing.

(Composition (1))

The composition (1) is an aqueous solution having a compound containing no Li element and containing at least one metal element (M) selected from the group consisting of Mg, Ca, Sr, Ba, Y, Ti, Zr, Hf, V, Nb, Ta, Cr, Mo, W, Mn, Fe, Co, Ni, Pb, Cu, Zn, Al, In, Sn, Sb, Bi, La, Ce, Pr, Nd, Gd, Dy, Er and Yb dissolved or dispersed in a solvent.

The metal element (M) is preferably Al, Zr or Nb, particularly preferably Al.

The compound containing a metal element (M) may, for example, be an inorganic salt such nitrate, sulfate or chloride of the metal element (M); an organic salt or an organic complex such as acetate, citrate, maleate, formate, lactate or oxalate; an oxoacid salt of the metal element (M), an ammine complex of the metal element (M), an alkoxide of the metal element (M), a carbonate of the metal element (M), an oxide of the metal element (M) or a hydroxide of the metal element (M). Particularly preferred is a nitrate, an organic salt, an organic complex, an ammonium salt of oxoacid or an ammine complex, which is likely to be decomposed by heat and has high solubility in a solvent.

The compound containing the metal element (M) is preferably ammonium zirconium carbonate, halogenated ammonium zirconium, zirconium acetate, zirconium nitrate, aluminum nitrate, aluminum acetate, aluminum oxalate, aluminum citrate, aluminum lactate, basic aluminum lactate, aluminum maleate, niobium nitrate, niobium acetate, niobium citrate, niobium maleate, niobium formate, niobium lactate, niobium oxalate or ammonium niobium oxalate.

The solvent of the composition (1) is preferably a solvent containing water in view of the stability and the reactivity of the compound containing the metal element (M), more preferably a mixed solvent of water and a water soluble alcohol and/or polyol, particularly preferably a solvent consisting solely of water. The water soluble alcohol may be methanol, ethanol, 1-propanol or 2-propanol. The polyol may be ethylene glycol, propylene glycol, diethylene glycol, dipropylene glycol, polyethylene glycol, butanediol or glycerin. The total content of the water soluble alcohol and polyol contained in the solvent is preferably from 0 to 20 mass %, more preferably from 0 to 10 mass % to the entire amount of the solvent. The solvent particularly preferably consists solely of water, in view of the safety, the environment, the handling efficiency and the cost.

The composition (1) may further contain a pH adjusting agent so as to adjust the solubility of the compound containing the metal element (M). The pH adjusting agent is preferably one which is volatilized or decomposed at the time of heating. Specifically, it is preferably an organic acid such as acetic acid, citric acid, lactic acid, formic acid, maleic acid or oxalic acid, or ammonia. When a pH adjusting agent which is volatilized or decomposed is used, impurities hardly remain, whereby favorable battery characteristics are likely to be obtained.

The pH of the composition (1) is preferably from 2 to 12, more preferably from 3 to 11, particularly preferably from 4 to 10. When the pH is within the above range, elution of the Li element and the transition metal from the lithium-containing composite oxide tends to be small when the lithium-containing composite oxide and the composition (1) are contacted, and further, the amount of impurities such as the pH adjusting agent tends to be small, whereby favorable battery characteristics are likely to be obtained.

In the production process of the present invention, to contact the lithium-containing composite oxide with the composition (1), particularly preferred is a method of spraying the composition (1) to the lithium-containing composite oxide by a spray coating method. The spray coating method is a simple process, and by this process, the surface of the lithium-containing composite oxide can uniformly be covered with the compound containing the metal element (M).

The concentration of the compound containing the metal element (M) contained in the composition (1) is preferably higher, since it is necessary to remove the solvent by heating in the subsequent step. However, if the concentration is too high, the viscosity tends to be high, and the uniform mixing property of the lithium-containing composite oxide with the composition (1) will be decreased. Accordingly, the concentration of the compound containing the metal element (M) contained in the composition (1) is preferably from 0.5 to 30 mass %, particularly preferably from 2 to 20 mass % as calculated as the metal element (M).

In the present invention, the amount A (ml/100 g) of the composition (1) to be contacted per 100 g of the lithium-containing composite oxide is preferably 0.1<A/B<5 to the oil absorption B (ml/100 g) of the lithium-containing composite oxide. The oil absorption B is obtained in accordance with the method as disclosed in JIS-K-5101-13-1:2004. When 0.1<A/B<5, the covering layer (I) can uniformly be formed, filtration will be unnecessary in the subsequent step, and further, the solvent to be evaporated at the time of heating is small, thus leading to high productivity. Further, it is particularly preferred that 0.1<A/B<0.7, whereby the lithium-containing composite oxide will not be agglomerated at the time of spray coating, and stirring will easily be conducted.

When A/B is at least 0.7, it is preferred to contact the composition (1) with the lithium-containing composite oxide with drying so as to prevent the lithium-containing composite oxide from being agglomerated. Spray coating and drying may be carried out alternately, or spray coating may be carried out with heating for dying simultaneously. The drying temperature is preferably from 40 to 200° C., more preferably from 60 to 150° C.

The particle size of the composition (1) to be sprayed by the spray coating method is preferably from 0.1 to 250 μm, more preferably from 1 to 150 μm. In a case where the particle size of the composition (1) is at most 250 μm, the powder of the lithium-containing composite oxide can more uniformly be covered with the composition (1). Further, when the particle size of the composition (1) to be sprayed is at least 0.1 μm, the particle size after spraying can easily be controlled. The discharge amount of the composition (1) in the spray coating method is preferably from 0.005 to 0.1 g/min per 1 g of the lithium-containing composite oxide. Further, in the production process of the present invention, the composition (1) may be contacted with the lithium-containing composite oxide by adding the composition (1) to the lithium-containing composite oxide with stirring and mixing them. As a stirring apparatus, a stirring machine with low shearing force such as a drum mixer or solid air may be employed. By contacting the composition (1) with the lithium-containing composite oxide with stirring for mixing, particles (I) having the compound containing the metal element (M) attached more uniformly to the surface of the lithium-containing composite oxide can be obtained.

(Particle (I))

The particles (I) in the present invention are particles having the compound containing the metal element (M) attached to the surface of the lithium-containing composite oxide. Here, "attached" means that the compound containing the metal element (M) is chemically adsorbed or physically adsorbed to a part of or the entire surface of the lithium-containing composite oxide.

In the particles (I), the proportion (molar ratio) of the metal element (M) is preferably from 0.001 to 0.05 time, more preferably from 0.003 to 0.04 time, particularly preferably from 0.005 to 0.03 time the transition metal element in the lithium-containing composite oxide.

The proportion of the metal element (M) present in the particles (I) can be obtained by ICP (high frequency inductively-coupled plasma) measurement of the cathode active material dissolved in an acid. In a case where the proportion of the covering layer (I) cannot be obtained by ICP measurement, it may be calculated based on the amounts of the lithium-containing composite oxide and the compound containing the metal element (M) charged.

Then, in the production process of the present invention, the particles (I) and the following compound (2) are mixed and heated to obtain particles (III) having a covering layer (II) containing the metal element (M) and fluorine element formed on the surface of the lithium-containing composite oxide.

(Compound (2))

The compound (2) is a compound which generates HF by heating. The compound (2) may be an inorganic salt such as $NH_4F$ (ammonium fluoride), $NH_4F \cdot HF$ (ammonium bifluoride), $NaF \cdot HF$ (sodium bifluoride) or $KaF \cdot HF$ (potassium bifluoride), a fluorinated polymer such as polyvinylidene fluoride, polytetrafluoroethylene or an ethylene/tetrafluoroethylene copolymer, or a fluorinated organic compound such as trifluoroacetic acid, trifluoroethanol, pentafluoropropanol, hydrofluorocarbon or hydrofluoroether. An inorganic salt such as $NH_4F$, $NH_4F \cdot HF$, $NaF \cdot HF$ or $KaF \cdot HF$ is preferred, which is decomposed at a low temperature of at most 250° C. to generate HF, and $NH_4F$ or $NH_4F \cdot HF$ is particularly preferred, with which an alkali component will not remain after heating. Compounds which generate HF by heating may be used alone or in combination of two or more.

The amount of the compound (2) is preferably from 0.1 to 10 parts by mass, more preferably from 0.2 to 5 parts by mass to the lithium-containing composite oxide (100 parts by mass).

As a method of mixing the compound (2), it is preferred to add the compound (2) to the lithium-containing composite oxide contacted with the composition (1) with stirring to mix the compound (2) with the lithium-containing composite oxide. As a stirring apparatus, a stirring machine with low shearing force such as a drum mixer or solid air may be employed.

Heating after mixing may be carried out in a nitrogen atmosphere or in an oxygen-containing atmosphere. Heating is preferably carried out by putting a mixture of the lithium-containing composite oxide and the compound (2) in a sealed container excellent in the corrosion resistance to HF, for example, a ceramic container with a lid. With a ceramic container with a lid, generated HF will not be volatilized but will be reacted with the metal element (M) on the surface of the lithium-containing composite oxide efficiently. Further, at the time of heating, it is considered to be effective to maintain the temperature to be in the vicinity of the temperature at which the compound (2) generates HF or to lower the temperature-increasing rate, so as to promote the reaction of HF with the metal element (M) on the surface of the lithium-containing composite oxide.

The heating temperature is preferably from 250 to 700° C., more preferably from 350 to 600° C. When the heating temperature is at least 250° C., a covering layer (I) containing the metal element (M) and fluorine element is likely to be formed, and further, volatile impurities such as remaining water tend to be small, whereby a decrease in the cycle characteristics can be suppressed. When the heating temperature is at most 700° C., it is possible to prevent a decrease of the charge/discharge capacity by diffusion of the metal element (M) into the inside of the lithium-containing composite oxide.

In a case where the surface of the lithium-containing composite oxide is covered with a covering layer (II) which is amorphous, the heating temperature is preferably from 250 to 550° C., more preferably from 350 to 500° C. If the heating temperature is less than 550° C., the covering layer (II) will hardly be crystallized.

The heating time is preferably from 0.5 to 24 hours, more preferably from 0.5 to 18 hours, particularly preferably from 1 to 10 hours.

(Covering Layer (II))

The covering layer (II) contains at least one metal element (M) selected from the group consisting of Li, Mg, Ca, Sr, Ba, Y, Ti, Zr, Hf, V, Nb, Ta, Cr, Mo, W, Mn, Fe, Co, Ni, Pb, Cu, Zn, Al, In, Sn, Sb, Bi, La, Ce, Pr, Nd, Gd, Dy, Er and Yb and fluorine element.

The entire metal element (M) may be bonded to F to form a fluoride, or a part of the metal element (M) may form an oxide or a hydroxide.

The covering layer (II) may, for example, be $MgF_2$, $CaF_2$, $SrF_2$, $BaF_2$, $YF_3$, $TiF_4$, $ZrF_4$, $HfF_4$, $VF_3$, $VF_4$, $NbF_3$, $NbF_5$, $TaF_5$, $CrF_3$, $MoF_3$, $WF_4$, $MnF_3$, $FeF_3$, $CoF_3$, $NiF_2$, $PbF_2$, $PbF_4$, $CuF_2$, $ZnF_2$, $AlF_3$, $InF_3$, $SnF_2$, $SbF_3$, $BiF_3$, $LaF_3$, $CeF_3$, $PrF_3$, $NdF_3$, $GdF_3$, $DyF_3$, $ErF_3$ or $YbF_3$. The covering layer (I) is preferably $AlF_3$, $ZrF_4$, $NbF_3$ or $NbF_5$, particularly preferably $AlF_3$.

In a case where the covering layer (II) contains an oxide, preferred is $Al_2O_3$, $ZrO_2$, $Nb_2O_3$ or $Nb_2O_5$, particularly preferred is $Al_2O_3$. In a case where the covering layer (II) contains a hydroxide, preferred is $Al(OH)_3$, $Zr(OH)_4$, $Nb(OH)_3$ or $Nb(OH)_5$, particularly preferred is $Al(OH)_3$.

With the cathode active material of the present invention, it is considered that by the lithium-containing composite oxide covered with the covering layer (II), contact of the lithium-containing composite oxide with an electrolytic solution can be reduced, and accordingly the elution of the transition metal element such as Mn from the lithium-containing composite oxide surface to the electrolytic solution is suppressed, and the cycle characteristics will be improved. Further, it is possible to prevent a decomposed product of the electrolytic solution from being attached to the surface of the lithium-containing composite oxide.

The covering layer (II) may be crystalline or may be amorphous, and is preferably amorphous. Here, amorphous means that no peak attributable to the covering layer (II) is observed in an X-ray diffraction measurement (hereinafter sometimes referred to as XRD). The reason is not clearly understood, but is considered as follows. When the covering layer (II) is amorphous, the covering layer (II) is likely to be eroded to the electrolytic solution and functions as a sacrificial layer, whereby elution of the transition metal element such as Mn on the surface of the lithium-containing composite oxide to the electrolytic solution can be suppressed, and the cycle characteristics will be improved.

The shape of the covering layer formed on the surface of the lithium-containing composite oxide may be the form of particles, a film, fibers, agglomerates or the like.

In a case where the covering layer is in the form of particles, the average particle size $D_{50}$ of the covering layer is preferably from 0.1 to 100 nm, more preferably from 0.1 to 50 nm, particularly preferably from 0.1 to 30 nm. The shape and the average particle size of the covering layer can be evaluated by an electron microscope such as a SEM (scanning electron microscope) or a TEM (transmission electron microscope). The average particle size is represented by an average of particle sizes of particles covering the lithium-containing composite oxide.

(Particles (III))

The particles (III) in the present invention are particles having the covering layer (II) formed on the surface of the lithium-containing composite oxide. Here, "formed" means a state where the covering layer (II) is chemically adsorbed or physically adsorbed to a part of or the entire surface of the lithium-containing composite oxide.

The shape of the particles (III) may be the form of particles, a film, fibers, agglomerates or the like. In a case where the particles (III) are in the form of particles, the average particle size of the particles (III) is preferably from 3 to 30 μm, more preferably from 4 to 25 μm, particularly preferably from 5 to 20 μm.

In the particles (III), the covering layer (II) may be formed on at least part of the surface of the lithium-containing composite oxide. Particularly, the particles (III) are preferably particles having an amorphous layer of the covering layer (II) formed on a part of or the entire surface of the particles (III).

In the covering layer (II) in the particles (III), the proportion (molar ratio) of the metal element (M) in the covering layer (II) is preferably from 0.001 to 0.05 time, more preferably from 0.003 to 0.04 time, particularly preferably from 0.005 to 0.03 time the transition metal element of the lithium-containing composite oxide. Within the above range, a large discharge capacity and excellent cycle characteristics are obtained.

To adjust the amount of the metal element (M), the lithium-containing composite oxide and the composition (I) are contacted so that the molar amount of the metal element (M) in the particles (I) is within a range of from 0.001 to 0.05 time the molar amount of the transition metal element of the lithium-containing composite oxide.

The amount of fluorine element present in the covering layer (II) in the particles (III) is preferably from 0.05 to 3.0 mass %, more preferably from 0.1 to 2.0 mass %, particularly preferably from 0.1 to 1.0 mass % to the entire mass of the cathode active material. When the fluorine element amount is within the above range, a cathode active material can be obtained with which a battery more excellent in the initial capacity and the cycle characteristics can be obtained.

The amount of fluorine element present in the covering layer (II) can be obtained in such a manner that the cathode active material is disposed in deionized water, the concentration of fluoride ions eluted is measured by a fluoride ion electrode, and from the obtained concentration of the eluted fluoride ions and the entire amount of the cathode active material, the amount of fluorine element can be calculated.

To adjust the amount of fluorine element present in the covering layer (II), the particles (I) and the compound (2) are mixed and heated so that the amount of fluorine element is from 0.05 to 3 mass % to the total mass of the cathode active material for a lithium ion secondary battery.

<Cathode>

The cathode for a lithium ion secondary battery of the present invention comprises a cathode active material layer containing the cathode active material of the present invention, an electrically conductive material and a binder formed on a cathode current collector. As a method for producing the cathode for a lithium ion secondary battery, a method of supporting the cathode active material of the present invention, an electrically conductive material and a binder on a cathode current collector may be mentioned. The electrically conductive material and the binder can be supported on a cathode current collector by dispersing them in a solvent and/or a dispersion medium to prepare a slurry, or kneading them with a solvent and/or a dispersion medium to prepare a kneaded product, followed by coating or the like.

The electrically conductive material may, for example, be carbon black such as acetylene black, graphite or ketjen black.

The binder may, for example, be a fluorinated resin such as polyvinylidene fluoride or polytetrafluoroethylene, a polyolefin such as polyethylene or polypropylene, a polymer or copolymer containing unsaturated bonds such as styrene/butadiene rubber, isoprene rubber or butadiene rubber, or an acrylic acid type polymer or copolymer such as an acrylic acid copolymer or a methacrylic acid copolymer.

The cathode current collector may be aluminum or an aluminum alloy.

<Lithium Ion Secondary Battery>

The lithium ion secondary battery of the present invention comprises the above cathode for a lithium ion secondary battery, an anode and a non-aqueous electrolyte.

The anode comprises an anode current collector and an anode active material layer containing an anode active material formed on the anode current collector. It can be produced, for example, by kneading an anode active material with an organic solvent to prepare a slurry, and applying the prepared slurry on the anode current collector, followed by drying and pressing.

The anode current collector may, for example, be a metal foil such as a nickel foil or a copper foil.

The anode active material is a material capable of adsorbing and desorbing lithium ions at a relatively low potential and may, for example, be lithium metal, a lithium alloy, a carbon material, an oxide consisting mainly of a metal in Group 14 or 15 of the periodic table, a carbon compound, a silicon carbide compound, a silicon oxide compound, titanium sulfide or a boron carbide compound.

The carbon material for the anode active material may, for example, be non-graphitizable carbon, artificial carbon, natural graphite, thermally decomposed carbon, cokes such as pitch coke, needle coke or petroleum coke, graphites, glassy carbons, an organic polymer compound fired product obtained by firing and carbonizing a phenol resin, furan resin, etc. at a suitable temperature, carbon fibers, activated carbon or carbon blacks.

The metal in Group 14 of the periodic table may, for example, be silicon or tin, and is preferably silicon.

In addition, a material which may be used as the anode active material may, for example, be an oxide such as iron oxide, ruthenium oxide, molybdenum oxide, tungsten oxide, titanium oxide or tin oxide, or a nitride such as $Li_{2.6}Co_{0.4}N$.

As the non-aqueous electrolytic solution, it is possible to use one prepared by suitably combining an organic solvent and an electrolyte. As the organic solvent, any solvent known as an organic solvent for an electrolytic solution may be used, and for example, it is possible to use propylene carbonate, ethylene carbonate, diethyl carbonate, dimethyl carbonate, 1,2-dimethoxyethane, 1,2-diethoxyethane, diglyme, triglyme, γ-butyrolacton diethyl ether, sulfolan, methyl sulfolan, acetonitrile, an acetic acid ester, a butylic acid ester, a propionic acid ester, etc. Particularly, from the viewpoint of the voltage stability, it is preferred to use a cyclic carbonate such as propylene carbonate, or a chain-structured carbonate such as dimethyl carbonate or diethyl carbonate. Such organic solvents may be used alone, or two or more of them may be used as mixed.

As the non-aqueous electrolytes, it is possible to use a solid electrolyte containing an electrolyte salt, a polymer electrolyte, a solid or geled electrolyte having an electrolyte mixed or dissolved in e.g. a polymer compound, etc.

The solid electrolyte may be any material so long as it has lithium ion conductivity, and an inorganic solid electrolyte or a polymer electrolyte may be used.

As the inorganic solid electrolyte, it is possible to use lithium nitride, lithium iodide, etc.

As the polymer electrolyte, it is possible to use e.g. an electrolyte salt and a polymer compound which dissolves the electrolyte salt. As the electrolyte salt and the polymer compound which dissolves the electrolyte salt, it is possible to use polyethylene oxide, polypropylene oxide, polyphosphazene, polyaziridine, polyethylene sulfide, polyvinyl alcohol, polyvinylidene fluoride, polyhexafluoropropylene, or a derivative, mixture or composite thereof.

As the geled electrolyte or the like, various polymer compounds which are geled upon absorption of the above non-aqueous electrolyte may be employed. As the polymer compound to be used for the geled electrolyte, it is possible to use, for example, a fluorinated polymer such as poly(vinylidene fluoride) or poly(vinylidene fluoride-co-hexafluoropropylene). Further, as a polymer compound to be used for the geled electrolyte, it is possible to use, for example, polyacrylonitrile, a copolymer of polyacrylonitrile, or an ether type polymer, such as a polyethylene oxide, or a copolymer or cross-linked product of polyethylene oxide. The monomer to be used for the copolymer may, for example, be polypropylene oxide, methyl methacrylate, butyl methacrylate, methyl acrylate or butyl acrylate.

As the matrix for the geled electrolyte, particularly preferred is a fluorinated polymer from the viewpoint of the stability against the redox reaction.

As the electrolyte salt to be used in the electrolyte, for example, $LiClO_4$, $LiPF_6$, $LiBF_4$, $CF_3SO_3Li$, LiCl or LiBr may, for example, be used.

The shape of the lithium ion secondary battery of the present invention may be suitably selected depending on the intended use from e.g. a coin-shape, a sheet-form (film-form), a folded shape, a wound cylinder with bottom, a button shape, etc.

EXAMPLES

Now, the present invention will be described in further detail with reference to Examples. However, it should be understood that the present invention is by no means restricted to such specific Examples.

<Example for Synthesis of Lithium-containing Composite Oxide>

By adding distilled water (1,245.9 g), nickel(II) sulfate hexahydrate (140.6 g), cobalt(II) sulfate heptahydrate (131.4 g) and manganese(II) sulfate pentahydrate (482.2 g) were uniformly dissolved to obtain a raw material solution. By adding distilled water (320.8 g), ammonium sulfate (79.2 g) was uniformly dissolved to obtain an ammonia source solution. By adding distilled water (1,920.8 g), ammonium sulfate (79.2 g) was uniformly dissolved to obtain a mother liquid. By adding distilled water (600 g), sodium hydroxide (400 g) was uniformly dissolved to obtain a pH-adjusting liquid.

Into a 2 L baffle-equipped glass reactor, the mother liquid was put and heated to 50° C. by a mantle heater, and the pH-adjusting liquid was added to bring the pH to be 11.0. While stirring the solution in the reactor by anchor-type stirring vanes, the raw material solution was added at a rate of 5.0 g/min, and the ammonia source solution was added at a rate of 1.0 g/min, to have a composite hydroxide of nickel, cobalt and manganese precipitated. During the addition of the raw material solution, the pH-adjusting liquid was added to maintain the pH in the reactor to be 11.0. Further, in order to prevent oxidation of the precipitated hydroxide, nitrogen gas was introduced into the reactor at a flow rate of 0.5 L/min. Further, the liquid was continuously withdrawn so that the liquid amount in the reactor would not exceed 2 L.

In order to remove impurity ions from the obtained composite hydroxide of nickel, cobalt and manganese, pressure filtration and dispersion to distilled water were repeated for washing. The washing was terminated when the electrical conductivity of the filtrate became 25 µS/cm, followed by drying at 120° C. for 15 hours to obtain a precursor.

The contents of nickel, cobalt and manganese in the precursor were measured by ICP and found to be 11.6 mass %, 10.5 mass % and 42.3 mass %, respectively, (nickel:cobalt:manganese=0.172:0.156:0.672 by molar ratio).

The precursor (20 g) and lithium carbonate (12.6 g) having a lithium content of 26.9 mol/kg were mixed and fired at 900° C. for 12 hours in an oxygen-containing atmosphere to obtain a lithium-containing composite oxide in Synthesis Example. The composition of the obtained lithium-containing composite oxide in Synthesis Example was $Li(Li_{0.2}Ni_{0.137}Co_{0.125}Mn_{0.538})O_2$. The lithium-containing composite oxide in Synthesis Example had an average particle size D50 of 5.9 µm, and a specific surface area of 2.6 $m^2$/g as measured by means of BET (Brunauer, Emmett, Teller) method. The oil absorption was measured using purified linseed oil in accordance with JIS-K-5101-13-1:2004, whereupon it was 44 (g/100 g).

Example 1

3.0 g of distilled water was added to 7.0 g of an aluminum lactate aqueous solution (Al content: 4.5 mass %, pH: 4.6) to prepare an Al aqueous solution (composition (1)).

Then, 2 g of the prepared Al aqueous solution was added by spraying to 10 g of the lithium-containing composite oxide in Synthesis Example with stirring, and the lithium-containing composite oxide in Synthesis Example and the Al aqueous solution were contacted with each other while being mixed. {(the total amount A of the composition (1) and the compound (2) contacted per 100 g of the lithium-containing composite oxide)/(the oil absorption B of the lithium-containing composite oxide)}=20/44=0.45. The lithium-containing composite oxide was not agglomerated, and its handling such as stirring was easy.

Then, the obtained mixture was dried at 90° C. for 2 hours, 0.10 g of $NH_4F$ (compound (2)) in the form of particles was added and mixed, the mixture was put in a ceramic crucible, lidded and heated in an oxygen-containing atmosphere at 400° C. for 8 hours to obtain a cathode active material in Example 1 comprising particles (III) having the surface of a lithium-containing composite oxide covered with a covering layer (II) containing metal element Al and fluorine. The calculated value of the fluorine content on the surface of the cathode active material assuming that the entire F contained in $NH_4F$ was reacted with the lithium-containing composite oxide (hereinafter sometimes referred to as fluorine charge amount) is 0.51 mass % based on the total mass of the cathode active material. In the cathode active material, the proportion of covering aluminum from the Al aqueous solution based on the total amount of nickel, cobalt and manganese as transition metal elements in the lithium-containing composite oxide in Synthesis Example by the molar ratio (covering amount) is {(the number of moles of the covering Al)/(the total number of moles of Ni, Co and Mn in the lithium-containing composite oxide before addition)}=0.025.

Then, the fluorine content on the surface of the cathode active material was quantitatively determined by the following method. First, the cathode active material (0.5 g) was accurately weighed, 50 mL of deionized water at 20° C. was added, and ultrasonic treatment (ultrasonic cleaner manufactured by AS ONE Corporation, frequency: 28 kHz) was carried out for 60 minutes to disperse the cathode active material in deionized water. The dispersion was left at rest for 16 hours, the supernatant fluid was collected, a total ionic strength adjustment buffer TISAB was added thereto, and using a fluoride ion electrode (manufactured by Tokokagaku Kenkyusho K.K.), the concentration of fluoride ions eluted into the dispersion of the cathode active material was measured. The fluorine content present in the covering layer (II) of the cathode active material was calculated from the fluoride ion concentration, whereupon it was 0.42 mass % based on the total mass of the cathode active material.

Example 2

The same operation as in Example 1 was carried out except that 0.33 g of $NH_4F$ was used as the compound (2).

The fluorine charge amount is 1.69 mass % based on the total mass of the cathode active material.

The fluorine content present in the covering layer (II) of the obtained cathode active material was quantitatively determined, whereupon it was 1.42 mass % based on the total mass of the cathode active material.

Comparative Example 1

With reference to the method disclosed in Patent Document 1, $AlF_3$ coating treatment by a wet method was carried out. That is, 2.64 g of $Al(NO_3)_3 \cdot 9H_2O$ was dissolved in 150 ml of distilled water, and 30 g of the lithium-containing composite oxide in Synthesis Example was added, followed by stirring. Then, while the temperature of the reactor was maintained at 80° C., a solution having 0.78 g of $NH_4F$ dissolved in 150 ml of distilled water was continuously added at a flow rate of 1 ml/min, followed by stirring at 80° C. for 24 hours. Then, drying was carried out in a warm air thermostat at 110° C. for 12 hours, and heat treatment to 400° C. was carried out in an inert atmosphere. Since the obtained cathode active material was agglomerated, it was pulverized in a mortar.

The fluorine charge amount is 1.33 mass % based on the total mass of the cathode active material.

The fluorine content present in the covering layer of the obtained cathode active material was quantitatively determined, whereupon it was 0.26 mass % based on the total mass of the cathode active material.

Comparative Example 2

The above prepared lithium-containing composite oxide was used as the cathode active material as it was.
(Example for Production of Cathode)

Each of the cathode active materials in Examples 1 and 2 and Comparative Examples 1 and 2 as the cathode active material, acetylene black (electrically conductive material) and a polyvinylidene fluoride solution (solvent: N-methylpyrrolidone) containing 12.1 mass % of polyvinylidene fluoride (binder) were mixed, and N-methylpyrrolidone was further added to prepare a slurry. The mass ratio of the cathode active material, acetylene black and polyvinylidene fluoride was 82/10/8. The slurry was applied on one side of an aluminum foil (cathode current collector) having a thickness of 20 μm by means of a doctor blade, followed by drying at 120° C. and roll pressing twice to prepare a cathode sheet. Cathode sheets obtained from the cathode active materials in Examples 1 and 2 are regarded as cathode sheets 1 and 2, respectively, and cathode sheets obtained from the cathode active materials in Comparative Examples 1 and 2 are regarded as cathode sheets 3 and 4.
(Example for Production of Battery)

Using each of the above-produced cathode sheets 1 to 4 as a cathode, a stainless steel simple sealed cell type lithium ion secondary battery was assembled in an argon globe box. A metal lithium foil having a thickness of 500 μm was used as an anode, a stainless steel plate having a thickness of 1 mm was used as an anode current collector, a porous propylene having a thickness of 25 μm was used as a separator, and as an electrolytic solution, a $LiPF_6$/EC (ethylene carbonate)+DEC (diethyl carbonate) (1:1) solution having a $LiPF_6$ concentration of 1 (mol/dm³) (a mixed solution of EC and DEC in a volume ratio (EC:DEC=1:1) having $LiPF_6$ as a solute) was used.

Lithium ion secondary batteries obtained by using the cathode sheets 1 to 4 are regarded as lithium batteries 1 to 4, respectively.
Examples 1 To 4 for Evaluation of Battery Characteristics
Examples for Evaluation of Initial Capacity and Cycle Characteristics Using the above-produced lithium batteries 1 to 4, the following evaluation is carried out. That is, the battery is charged to 4.7 V with a load current of 200 mA per 1 g of the cathode active material, and then discharged to 2.5 V with a load current of 50 mA per 1 g of the cathode active material. Then, it is charged to 4.3 V with a load current of 200 mA per 1 g of the cathode active material, and then discharged to 2.5 V with a load current of 100 mA per 1 g of the cathode active material.

Each of the lithium batteries 1 to 4 charged and discharged in such a manner is then charged to 4.6 V with a load current of 200 mA per 1 g of the charged and discharged cathode active material, and discharged to 2.5 V with a load current of 100 mA per 1 g of the cathode active material. The discharge capacity of the cathode active material at from 4.6 to 2.5 V is taken as the 4.6 V initial capacity.

Then, a charge and discharge cycle of charging the battery to 4.6 V with a load current of 200 mA per 1 g of the charged and discharged cathode active material and discharging it to 2.5 V with a load current of 100 mA per 1 g of the cathode active material is repeatedly carried out 50 times. A value obtained by dividing the discharge capacity in the 50th 4.6 V charge and discharge cycle by the 4.6 V initial capacity is taken as the cycle retention rate.

The cycle retention rates of the lithium batteries 1 to 3 are shown in Table 3. The fluorine content/fluorine charge amount is taken as the fluorination efficiency. To evaluate the cycle retention rate, a case where the cycle retention rate is improved as compared with the lithium battery 4 is evaluated as ○.

TABLE 1

| | Cathode active material | Fluorine charge amount | Fluorine content | Fluorination efficiency | Cycle retention rate |
|---|---|---|---|---|---|
| Lithium battery 1 | Ex. 1 | 0.51% | 0.42% | 82% | ○ |
| Lithium battery 2 | Ex. 2 | 1.69% | 1.42% | 84% | ○ |
| Lithium battery 3 | Comp. Ex. 1 | 1.33% | 0.26% | 19% | ○ |

As shown in Table 1, each of the lithium batteries 1 to 3 has improved battery characteristics as compared with a case of using the untreated cathode active material (Comparative Example 2). The fluorination efficiency of each of the cathode active materials in Examples 1 and 2 is at least 80%, and it was confirmed that fluorine derived from $NH_4F$ and aluminum as the metal element (M) on the surface of the lithium-containing composite oxide were reacted efficiently. On the other hand, the cathode active material in Comparative Example 1 had a fluorination efficiency of at most 20%, and it is considered that the most part of $NH_4F$ was lost in the process of filtration and washing.

INDUSTRIAL APPLICABILITY

According to the present invention, it is possible to obtain a cathode active material for a lithium ion secondary battery having a high discharge capacity per unit mass and having excellent cycle characteristics. The cathode active material can be utilized for lithium ion secondary batteries for electronic instruments such as mobile phones, and for vehicles, which are small in size and light in weight.

According to the production process of the present invention, a covering layer can be formed on the surface of the cathode active material by a simple method without using special equipment, thus leading to excellent productivity.

This application is a continuation of PCT Application No. PCT/JP2012/066060, filed on Jun. 22, 2012, which is based upon and claims the benefit of priority from Japanese Patent Application No. 2011-140494 filed on Jun. 24, 2011. The contents of those applications are incorporated herein by reference in its entirety.

What is claimed is:

1. A process for producing a cathode active material for a lithium ion secondary battery, comprising:
contacting a lithium-containing composite oxide containing Li element and a transition metal element with a composition (1) such that particles (I) are obtained and that the particles (I) comprises the lithium-containing composite oxide and a compound containing a metal element (M) attached to the lithium-containing composite oxide;
mixing the particles (I) and a compound (2) such that a mixture is formed; and
heating the mixture such that particles (III) comprising the lithium-containing composite oxide and a covering layer (II) formed on a surface of the lithium-containing composite oxide are obtained and that the covering layer (II) comprises the metal element (M) and a fluorine element,
wherein the composition (1) comprises a compound containing no Li element and containing the metal element (M),
the metal element (M) is at least one selected from the group consisting of Mg, Ca, Sr, Ba, Y, Ti, Zr, Hf, V, Nb, Ta, Cr, Mo, W, Mn, Fe, Co, Ni, Pb, Cu, Zn, Al, In, Sn, Sb, Bi, La, Ce, Pr, Nd, Gd, Dy, Er and Yb dissolved or dispersed in a solvent,
the compound (2) is a compound which generates HF by heating, and
the mixing of the particles (I) and the compound (2) comprises mixing the particles (I) and a solid form of the compound (2).

2. The process according to claim 1, wherein the compound (2) is ammonium fluoride or ammonium bifluoride.

3. The process according to claim 1, wherein the metal element (M) is at least one of Al, Nb and Zr.

4. The process according to claim 1, wherein the heating is carried out at a temperature of from 250 to 700° C.

5. The process according to claim 1, wherein, in the contacting, the lithium-containing composite oxide and the composition (1) are contacted such that a molar amount of the metal element (M) in the particles (I) is from 0.001 to 0.05 time of a molar amount of the transition metal element in the lithium-containing composite oxide.

6. The process according to claim 1, wherein, in the mixing and the heating, the particles (I) and the compound (2) are mixed and heated such that an amount of the fluorine element in the covering layer (II) is from 0.05 to 3 mass % based on the total mass of the cathode active material.

7. The process according to claim 1, wherein the solvent of the composition (1) is water.

8. The process according to claim 1, wherein the contacting of the lithium-containing composite oxide and the composition (1) comprises adding the composition (1) to the lithium-containing composite oxide, and stirring and mixing the lithium-containing composite oxide and the composition (1).

9. The process according to claim 1, wherein the contacting of the lithium-containing composite oxide and the composition (1) comprises spraying the composition (1) to the lithium-containing composite oxide.

10. The process according to claim 1, wherein the lithium-containing composite oxide is represented by formula (C-1):

$$Li(Li_xMn_yMe'_z)O_pF_q \quad (C-1)$$

where Me' is at least one element selected from the group consisting of Co, Ni, Cr, Fe, Al, Ti, Zr, and Mg, and x, y, z, p and q satisfy $0.09<x<0.3$, $y>0$, $z>0$, $1.9<p<2.1$, $0\leq q\leq 0.1$, $0.4\leq y/(y+z)\leq 0.8$, $x+y+z=1$, and $1.2<(1+x)/(y+z)$.

11. The process according to claim 10, wherein x, y, and z in formula (C-1) satisfy $1.25\leq(1+x)/(y+z)\leq 1.75$.

12. The process according to claim 1, wherein the lithium-containing composite oxide has an average particle size ($D_{50}$) of from 3 to 30 μm.

13. The process according to claim 1, wherein the lithium-containing composite oxide has an average particle size ($D_{50}$) of from 4 to 25 μm.

14. The process according to claim 1, wherein the heating comprises heating the mixture for 1 to 10 hours.

15. The process according to claim 1, further comprising:
drying the particles (I) at a temperature of from 40 to 200° C. prior to the mixing of the particles (I) and the compound (2).

* * * * *